(12) United States Patent
Jensen et al.

(10) Patent No.: US 11,949,637 B2
(45) Date of Patent: Apr. 2, 2024

(54) ADDRESSING CONDITIONS IMPACTING COMMUNICATION SERVICES

(71) Applicant: Zoom Video Communications, Inc., San Jose, CA (US)

(72) Inventors: Patrick John Jensen, Fresno, CA (US); Michael Adrian White, Alpine, UT (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/711,485

(22) Filed: Apr. 1, 2022

(65) Prior Publication Data

US 2023/0318995 A1    Oct. 5, 2023

(51) Int. Cl.
*H04L 51/046* (2022.01)
*H04L 41/5009* (2022.01)
*H04L 51/48* (2022.01)

(52) U.S. Cl.
CPC ........ *H04L 51/046* (2013.01); *H04L 41/5009* (2013.01); *H04L 51/48* (2022.05)

(58) Field of Classification Search
CPC .... H04L 51/046; H04L 41/5009; H04L 51/48
See application file for complete search history.

(56) References Cited

U.S. PATENT DOCUMENTS

| | | |
|---|---|---|
| 7,895,314 B1 | 2/2011 | Russell |
| 10,701,214 B2 | 6/2020 | Richards et al. |
| 10,708,795 B2 | 7/2020 | Tapia |
| 2008/0075017 A1 | 3/2008 | Kramer |
| 2010/0211669 A1* | 8/2010 | Dalgas ...................... G06F 9/50 709/224 |
| 2014/0130111 A1* | 5/2014 | Nulty ................. H04N 21/6118 725/107 |
| 2019/0124020 A1* | 4/2019 | Bobbarjung ......... G06Q 20/123 |
| 2020/0401936 A1 | 12/2020 | Embarmannar Vijayan et al. |

(Continued)

FOREIGN PATENT DOCUMENTS

EP    3249556 A1    11/2017

OTHER PUBLICATIONS

International Search Report and Written Opinion dated Aug. 23, 2023 in corresponding PCT Application No. PCT/US2023/016079.

(Continued)

*Primary Examiner* — Joe Chacko
(74) *Attorney, Agent, or Firm* — Young Basile Hanlon & MacFarlane, P.C.

(57) ABSTRACT

A server of an on-premises data center used for a software platform identifies a condition impacting real-time communication services at a premises housing devices accessing the software platform. The server transmits, to a device of an administrator associated with the premises via a messaging application for real-time communication between two or more human-operated devices, a message indicating the condition and including one or more selectable elements each associated with a different action for addressing the condition. The server receives an indication of a selectable element selected from amongst the one or more selectable elements at the device of the administrator. The server causes performance of the action associated with the selected selectable element.

18 Claims, 8 Drawing Sheets

(56) References Cited

U.S. PATENT DOCUMENTS

2022/0350466 A1    11/2022    Amin et al.

OTHER PUBLICATIONS

Siti Rahayu Abdul Aziz et al.: "Proactive notification system using instant messaging bot (IM bot)", Science and Social Research (CSSR), 2010 International Conference On, IEEE, Dec. 5, 2010 (Dec. 5, 2010), pp. 695-698, XP031875575, DOI: 10.1109/CSSR.2010.5773871 ISBN: 978-1-4244-8987-9 the whole document.

* cited by examiner

US 11,949,637 B2

ADDRESSING CONDITIONS IMPACTING COMMUNICATION SERVICES

FIELD

This disclosure relates to real-time communication services, such as those that may be used with software services implemented over a network. More specifically, this disclosure relates to addressing conditions impacting communication services.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
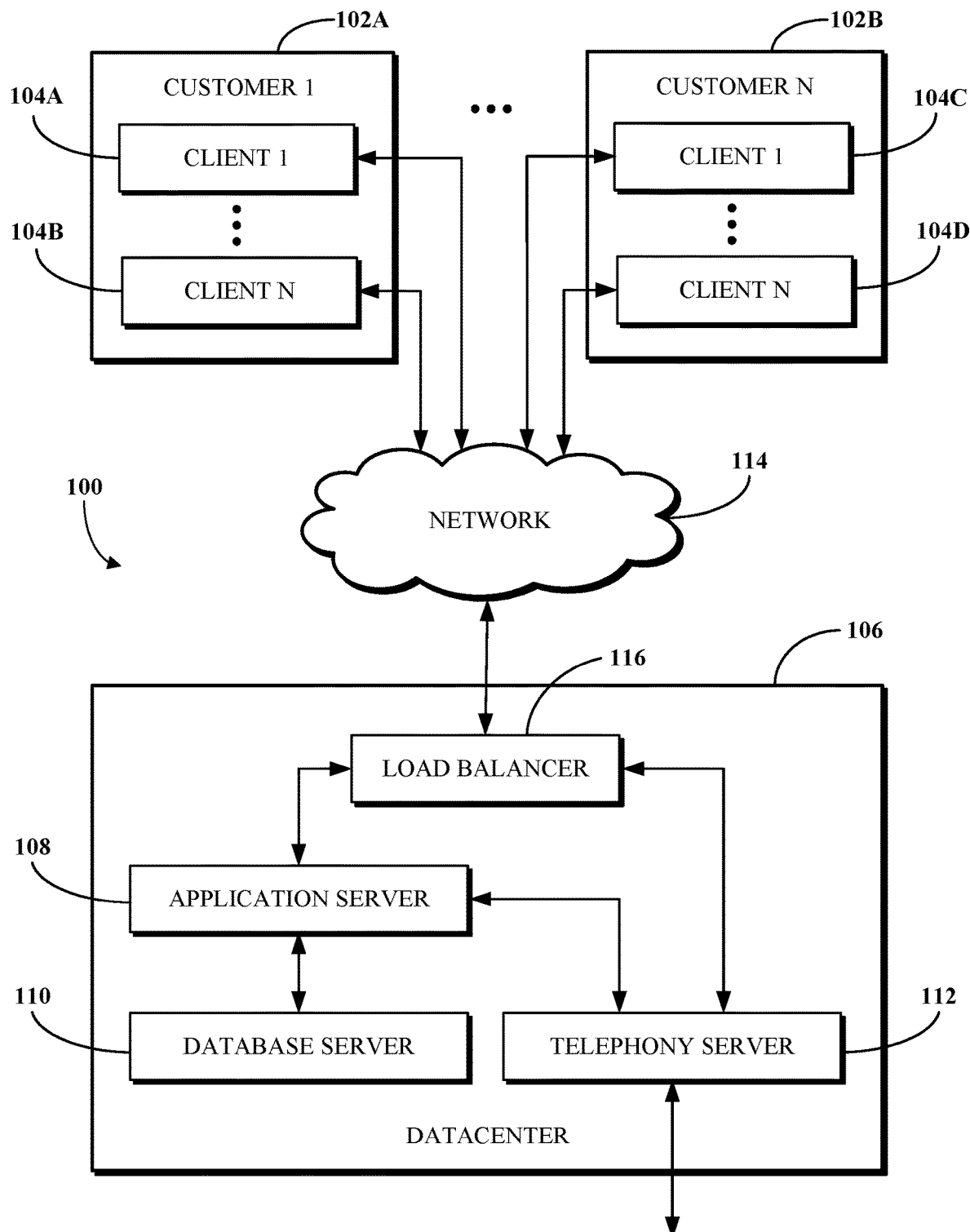
FIG. 1 is a block diagram of an example of an electronic computing and communications system.

A business (or other entity) may hire information technology (IT) administrators to handle conditions impacting real-time communication services, such as telephony services or conferencing services, at a premises of the business (e.g., on a local network of the premises of the business). The conditions may include, for example, outage conditions, insufficient processing capacity conditions, low network speed conditions, and poor audio or video quality conditions. An administrator may rely on various notification systems that are disjointed and not consistent (regarding delivery of notifications to different mobile, desktop, pager, or web applications) to monitor for such conditions that may occur on the premises of the business. For example, the administrator may need to check a first dedicated application to determine if a first condition exists, a second dedicated application to determine if a second set of conditions exist, an email application to determine if a third set of conditions exist, and a mobile phone text messaging application to determine if a fourth set of conditions exist. The use of multiple notification systems may confuse the administrator (as the administrator may inadvertently fail to check one of the dedicated applications), waste the administrator's time (in accessing multiple different applications), or result in slower resolution of the conditions (as the administrator might not access some applications frequently). Providing the administrator with notifications of conditions in a manner that the administrator can easily access and respond to the conditions may be technically challenging. Techniques for managing notifications associated with conditions impacting telephony services or conferencing services may be desirable.

Implementations of this disclosure address problems such as these by having a server of an on-premises data center identify (e.g., by monitoring an on-premises network and off-premises networks) a condition impacting telephony services or conferencing services of a premises. The monitoring may be accomplished, for example, using webhooks that notify the server whenever predefined key performance indicators are met.

Upon detecting a condition impacting telephony services or conferencing services, the server transmits, to a device of an administrator and via a messaging application, a message indicating the condition. The messaging application may be an application for messaging between two or more human-operated devices, for example, an instant messaging application or an Extensible Messaging and Presence Protocol (XMPP) application. The message includes one or more selectable elements for taking actions to manage the condition. The actions to manage the condition may include draining an impacted node, shutting down the impacted node, or triaging the impacted node. The actions may be identified at the server, for example, using action identification software that leverages statistical or artificial intelligence techniques.

The server receives an indication of a selectable element (e.g., corresponding to an action) that was selected from the one or more selectable elements. The server causes performance of the action associated with the selectable element that was selected. For example, the server may transmit a signal that causes network devices impacted by the selected action to perform the selected action. After the selected action is performed, the server may receive a confirmation that the action was performed and verify whether the action resolved the condition. The information regarding whether the action resolved the condition could be used to train action identification software at the server, for example, using online learning techniques.

To describe some implementations in greater detail, reference is first made to examples of hardware and software structures used to implement addressing conditions impacting communication services. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a Unified Communications as a Service (UCaaS) platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
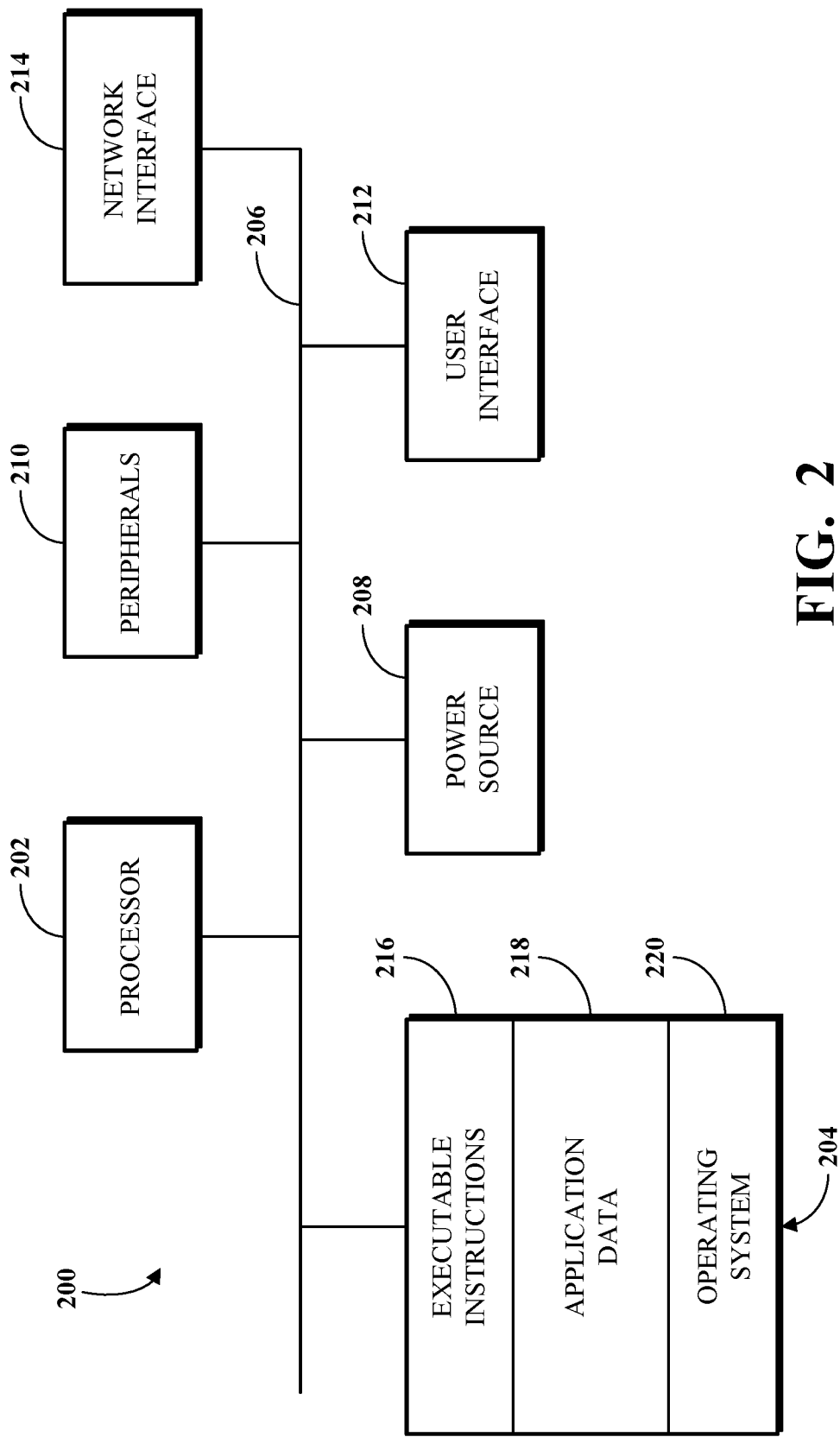
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
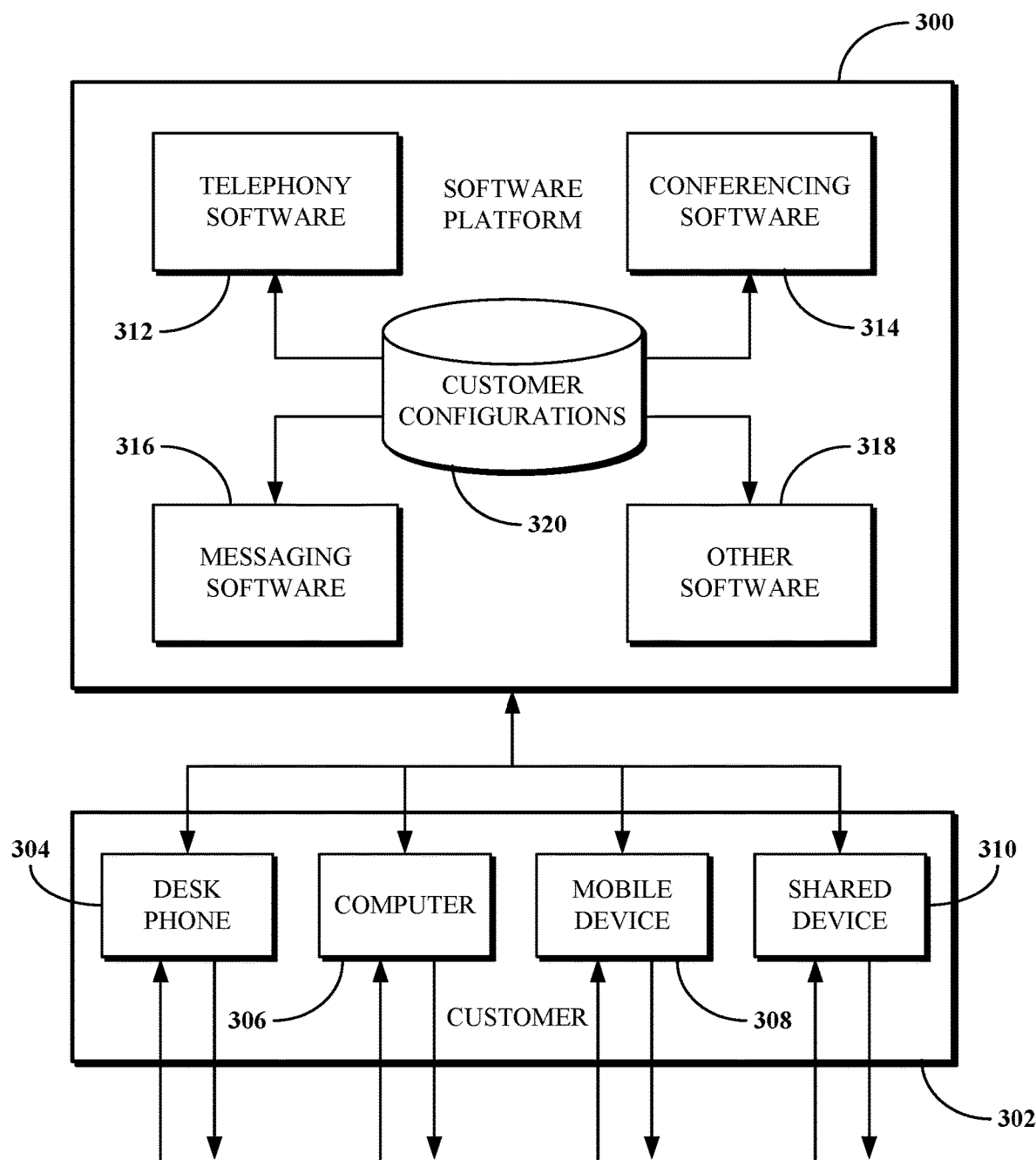
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for addressing conditions impacting communication services.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
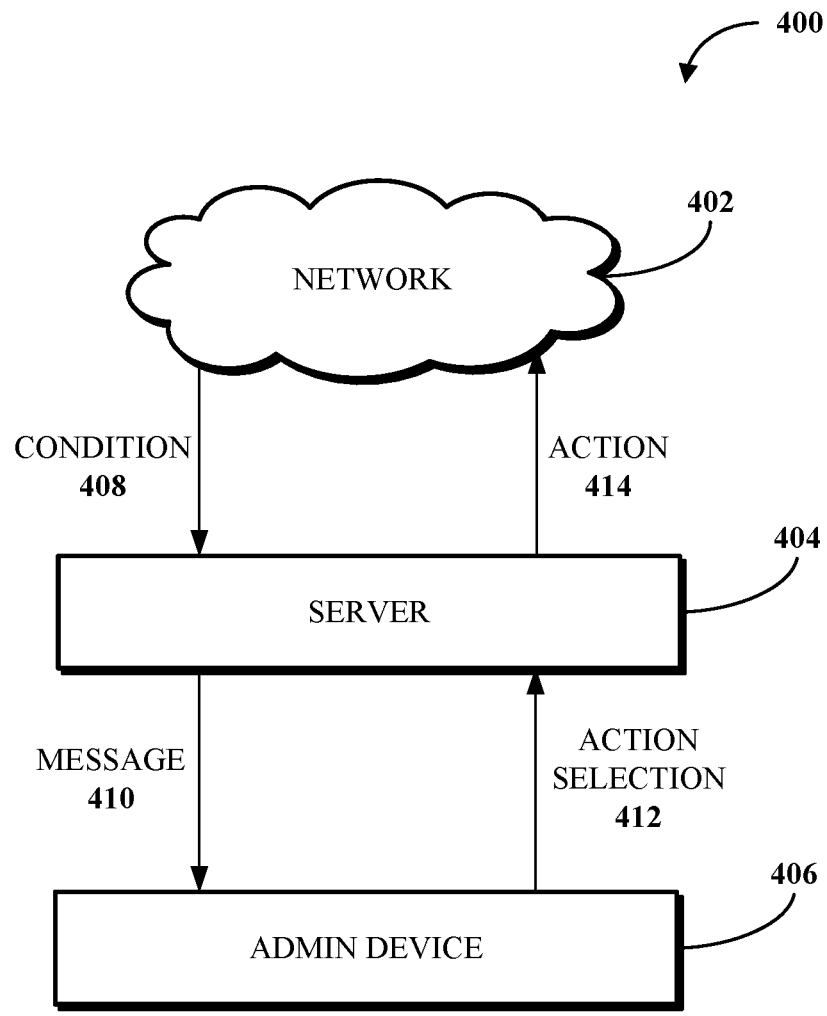
FIG. 4 illustrates an example system in which addressing conditions impacting communication services may be implemented.

FIG. 4 illustrates an example system 400 in which addressing conditions impacting communication services may be implemented. The communication services may include real-time communication services, for example, audio conferencing services, video conferencing services, audio calling services, video calling services, online chat services, text messaging services, or file transfer services. For example, the communication services may be or include communication services implemented by a software platform, such as the software platform 300 shown in FIG. 3.

As shown, the system 400 includes a network 402 over which communication services are implemented, a server 404, and an administrator (admin) device 406. While the server 404 and the administrator device 406 are illustrated as communicating with one another directly, the server 404 and the administrator device 406 may communicate with one another over the network 406 and/or at least one other network. The network 402 may include at least one of an on-premises network on the premises of a business (or other entity) or an off-premises network. The network 402 may correspond to all or part of the network 114. For example, where the network 402 is an on-premises network 402 in which the server 404 is a server of an on-premises data center, the network may be a LAN, a WAN, a VPN, or another public or private network configured for use by devices at the premises. The server 404 includes software and/or hardware for addressing conditions impacting communication services. The server 404 may be a local node that is associated with a single customer (e.g., the customer 102A or the customer 102B) or a single premises. Alternatively, the server 404 may correspond to a server of the datacenter 106, for example, the application server 108. The administrator device 406 may be a human-operated device, for example, at least one of a desktop computer, a laptop computer, a tablet computer, a mobile phone, a smart watch, or a personal digital assistant. The administrator device 406 may correspond to a client 104A, 104B, 104C, or 104D or a client 304, 306, 308, or 310, to the extent different. The administrator device 406 may be used by an IT administrator for addressing conditions impacting communication services. Each of the server 404 or the administrator device 406 may include the components of the computing device 200.

As illustrated in FIG. 4, the server 404 identifies a condition 408 associated with the network 402 that impacts use or availability of one or more of the communication services at a premises. The server 404 may identify the condition 408 by monitoring nodes (e.g., other servers, routers, switches, gateways, modems, access points, or other networking devices) on the network 402 and/or other sensors associated with the network 402, and detecting when a measurable state (e.g., processing speed or load) of the networking devices enters a predetermined range. The monitored information may include service status and/or telemetry (central processing unit utilization, disk usage, memory usage, network input/output, and/or conference or call status). Alternatively, the server 404 may implement predictive technology (e.g., an artificial intelligence technology, a statistical technology, or a rule-based technology) to predict future times when the measurable condition of the networking devices may enter the predetermined range. For example, if a conference that is hosted on the premises is scheduled and 1000 users on the premises confirmed, via calendar invites, that they will be attending the conference, the server 404 may predict the condition 408 of high network load during the time of the conference.

Upon identifying the condition 408, the server 404 transmits, to the administrator device 408, a message 410 indicating the condition 408 and including one or more selectable elements (e.g., the selectable elements may be buttons within chat cards that are composed on the display unit of the administrator device 408) each associated with a different action for addressing the condition 408. The message 410 is transmitted via a messaging application for real-time communication between two or more human-operated devices, for example, a XMPP application. In some implementations, XMPP provides the notification transit mechanism for the chat messages, including sending commands that compose the chat cards (including the selectable elements) on the screen of the receiving device. For example, if the condition is that an on-premises network node is unavailable, the selectable elements may include a selectable element to handle conferences, calls, or messages associated with the node externally to the premises and a selectable element to handle conferences, calls, or messages associated with the node using a different node.

The server 404 may store a table (or other data structure) mapping conditions to actions associated with selectable elements. According to some implementations, all or part of the table is generated manually by a human who lists conditions and approaches to addressing the conditions. According to some implementations, all or part of the table is generated automatically by recording techniques used by IT administrators to address conditions. In some examples, the table is generated automatically by recording techniques used by IT administrators to address conditions and an online machine learning engine may be applied to expand the listed conditions to other conditions. The online machine learning engine may be a supervised learning engine that is trained based on a dataset of recorded conditions, actions applied for addressing the conditions, and whether the actions were successful. Alternatively, if whether the actions were successful is unknown for some of the conditions, semi-supervised learning or unsupervised learning techniques may be used. In semi-supervised learning or unsupervised learning implementations, the training dataset may include techniques which successfully resolved conditions, techniques that were tried but did not lead to successful resolutions, and techniques which were tried the result of which is not stored. Furthermore, the online machine learning engine may observe new conditions that are detected and new actions taken by IT administrators in real-time, and further train itself based on the detected conditions, the taken actions, and whether a given taken action is successful in addressing a given detected condition. In some implementations, reinforcement learning may be used to train the online machine learning engine, with the online machine learning engine attempting to predict which actions are to be taken to address a condition, transmitting selectable elements associated with those actions to the administrator device 406, being rewarded if the action is taken or if the action is successful in addressing the condition, or being penalized if the action is not taken or is unsuccessful in addressing the condition.

In response to the message 410, a user of the administrator device 406 may select one of the selectable elements, and an action selection 412 may be transmitted from the administrator device 406 to the server 404. The server 404 may cause devices on the network 402 to perform an action 414 associated with the action selection 412. For example, the server 404 may transmit, to one or more devices on the network 402, an instruction based on the action selection 412.

Some implementations are described with a selectable element being used to identify a selected action in the action selection 412. For example, the selection of the action may be made using selectable elements such as at least one of a menu (e.g., a dropdown menu), a radio button, a checkbox, or a hyperlink.

Some implementations are described in conjunction with real-time communication services. However, the communication services may be expanded to include other network-based communication services, such as email services, web browsing services, or web hosting services. In some implementations, the disclosed techniques could be used in conjunction with addressing any network condition, regardless of whether the network condition is related to real-time communication services.

Figure 5:
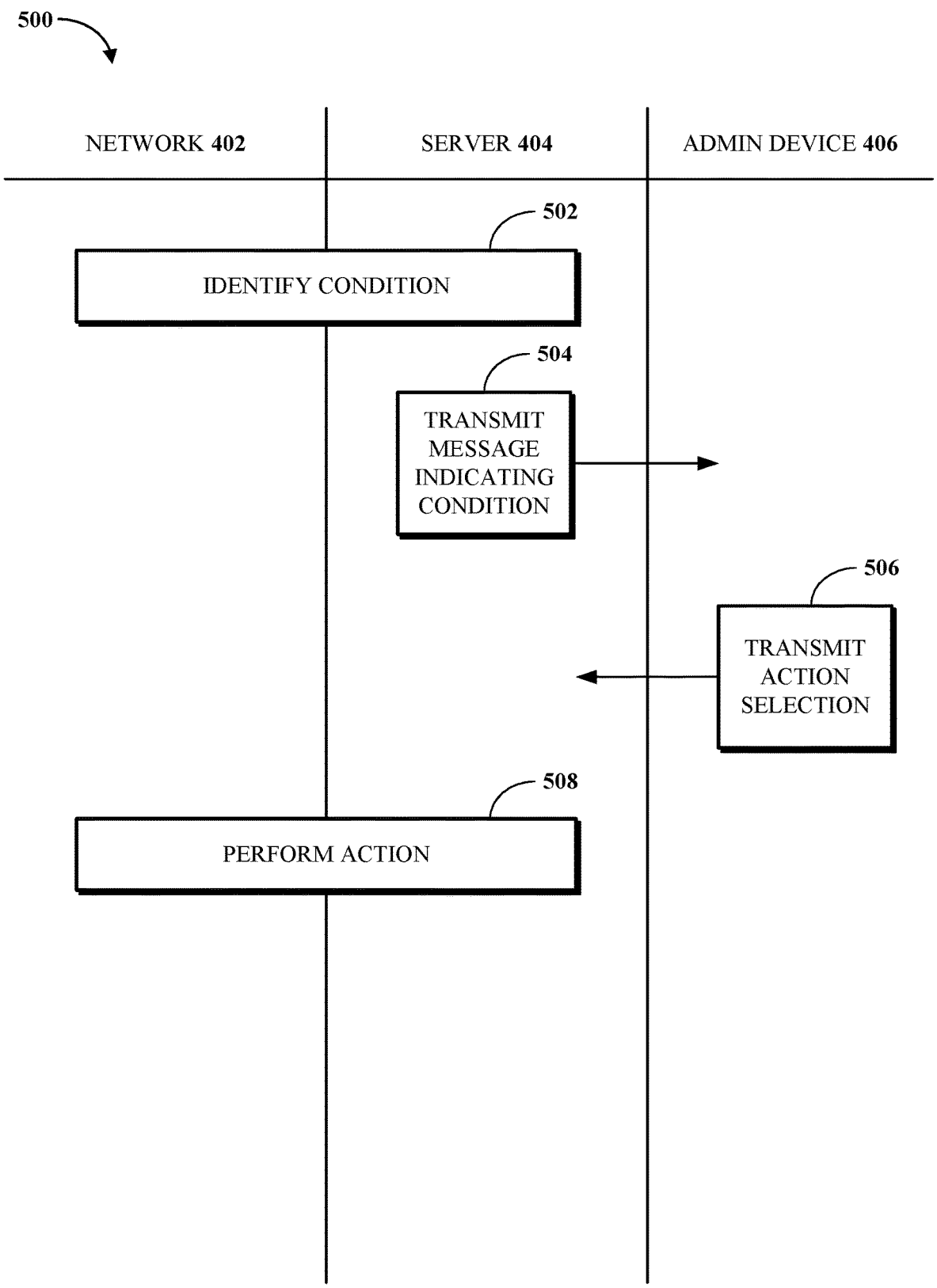
FIG. 5 is a data flow diagram of an example technique for addressing conditions impacting communication services.

FIG. 5 is a data flow diagram of an example technique 500 for addressing conditions impacting communication services. As shown, the technique 500 is performed using the network 402, the server 404, and the administrator device 406.

At block 502, the server 404 identifies a condition on the network 402 that impacts real-time communications at a premises. For example, the server 404 may access stored information about planned uses of the network 402 or the server may receive status information (e.g., load information or partial outage information) from nodes (e.g., network devices such as routers) on the network 402. The premises may include multiple devices (e.g., computers or telephones) that access the network 402. The network 402 may be a network of the premises. The server 404 may be located on the premises.

At block 504, the server 404 transmits a message indicating the condition to the administrator device 406. The administrator device 406 may be a human-operated device (e.g., a desktop computer, a laptop computer, a mobile phone, a tablet computer, or a smartwatch). The message is transmitted via a messaging application for real-time communication between two or more human-operated devices. The message indicates the condition and suggests actions for addressing the condition. The actions may be indicated via selectable elements (e.g., buttons) within at least one chat card which, when selected by the user of the administrator device 406, notify the server 404 of the selected action. Alternatively, the actions may be indicated in a menu or via a selection interface that includes checkboxes and/or radio buttons. In some cases, if the messaging application is an audio messaging application, (e.g., a voice calling application) an interactive voice response (IVR) menu may be used. For example, the user of the administrator device 406 may be notified of a first action, a second action, and a third action, and may be asked to press or say 1 to take the first action, press or say 2 to take the second action, or press or say 3 to take the third action.

At block 506, after receiving an action selection from the user, the administrator device 406 transmits an indication of the action selection to the server 404. The server 404 receives the action selection. The action selection may be transmitted from the administrator device 406 to the server 404 via the network 402 or another network.

In some cases, the message of block 504 is transmitted to a single administrator device 406. Alternatively, the message may be transmitted to multiple administrator devices, including the administrator device 406. If there are multiple administrator devices, the server 404 may take the action indicated by the first received action selection. Alternatively, the server may wait until a certain proportion (e.g., 60%) of the administrator devices respond, and then take the most popular action (which received the largest number of selections or "votes"). In some cases, if there are different action selections from different administrator devices that are not inconsistent with one another, all of the selected actions may be taken.

At block 508, the server 404 causes performance of the selected action by nodes of the network 402. For example, the server 404 may transmit, to the nodes, instructions to perform the selected action. The server 404 may receive, from the impacted nodes, a confirmation that the action was performed. The server 404 may provide, to the administrator device 406, a message indicating that the action was performed and, in some cases, an indication regarding whether the action successfully resolved the condition.

In one use case, a conference with 1000 confirmed (e.g., by responding to a calendar invite or otherwise affirmatively indicating a plan to attend) attendees is scheduled for 12 pm on Friday, April 1. The conference is set to be hosted at Node ABC, a node of the network 402 with bandwidth for a maximum of 100 attendees. The server 404 determines this information by accessing the confirmations (e.g., received via an email server or via software associated with the conference) and identifying the node that is assigned to host the conference. The node that is assigned to host the conference is identified based on network resource assignment settings accessible to the server 404. The server 404 generates a message 410 indicating that the conference is to be hosted at Node ABC, and that Node ABC is not able to handle the expected 1000 attendees. The message 410 is transmitted from the server 404 to the administrator device 406. The message 406 may indicate multiple proposed actions for addressing the condition of Node ABC being unable to host the conference and may include hyperlinks, radio buttons, checkboxes or a menu for selecting one or more of the proposed actions.

Upon receiving the message 410, the administrator device 406 presents the message to the user, via a graphical user interface or via an audio interface, and receives a response from the user indicating a selection of one or more of the proposed actions. For example, the user of the administrator device 406 may select a selectable element associated with an action or press a button associated with an action in an IVR menu. In one example, the selected action is replacing Node ABC with a larger node that is capable of handling more than 1000 attendees. The administrator device 406 transmits an indication of the selected action to the server 404. In response, the server 404 causes the network 402 to implement the selected action. For example, the server 404 may determine that Node DEF is capable of handling more than 1000 attendees and may transmit, via the network 402 and to Node ABC and Node DEF, instructions indicating that Node DEF should host the conference in place of Node ABC.

Figure 6:
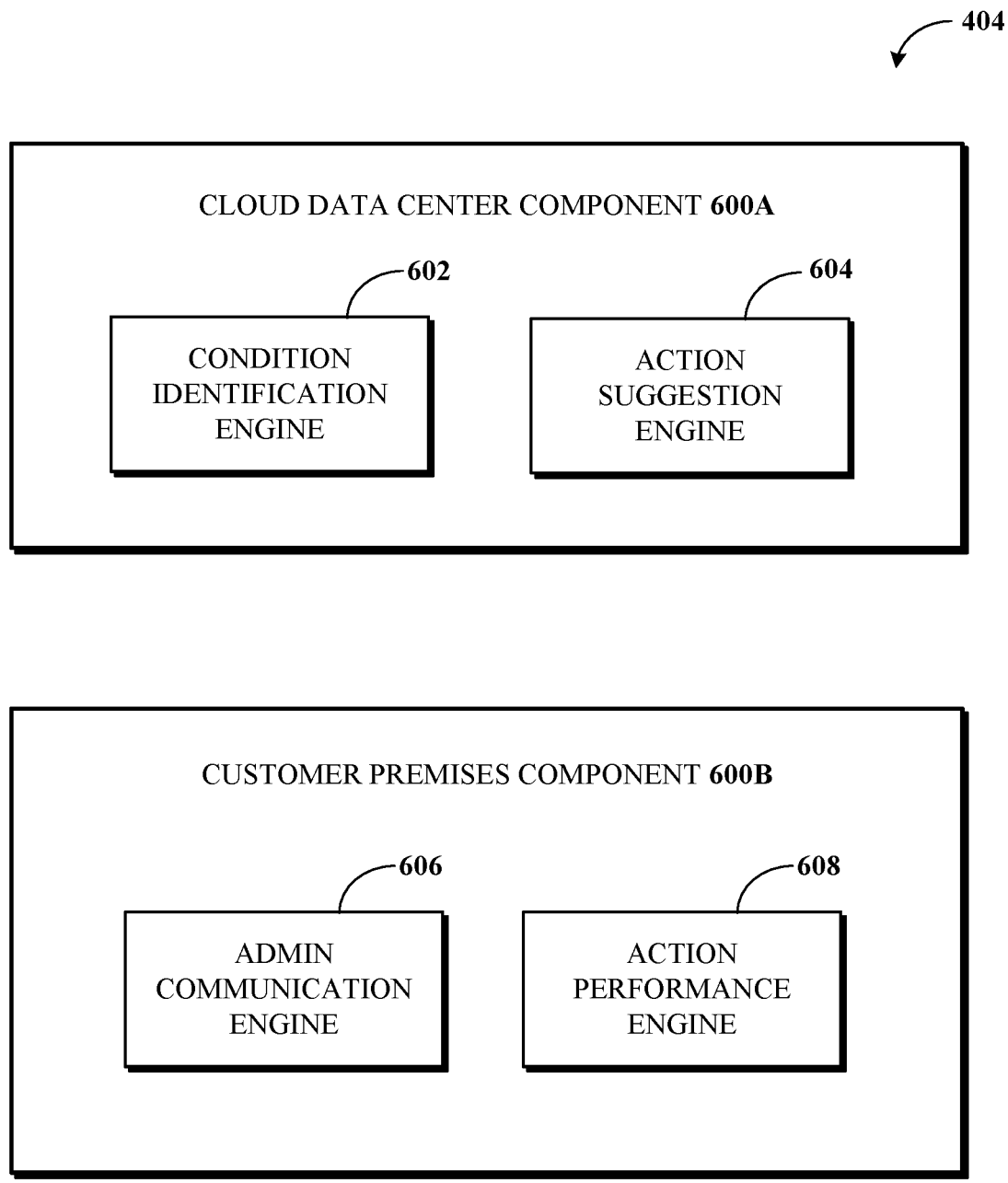
FIG. 6 is a block diagram of an example server for addressing conditions impacting communication services.

FIG. 6 is a block diagram of an example of the server 404 for addressing conditions impacting communication services. As shown, the server 404 is subdivided into a cloud data center component 600A and a customer premises component 600B. In alternative implementations, the server 404 may have different components or a single component that includes the parts of the cloud data center component 600A and the parts of the customer premises component 600B. In some implementations, the cloud data center 600A component resides at the datacenter 106, and the customer premises component 600B resides at the customer 102A, 102B. As shown, the cloud data center component 600A of the server 404 includes a condition identification engine 602 and an action suggestion engine 604. The customer premises component 600B of the server 404 includes an administrator (admin) communication engine 606 and an action performance engine 608. An engine and/or a component may be implemented using software, hardware, or a combination of software and hardware. In some implementations, the engine and/or the component may include software instructions stored in memory (e.g., the executable instructions 216). In some implementations, the engine may be hard-wired into one or more processors (e.g., the processor 202).

The condition identification engine 602 of the cloud data center component 600A identifies conditions that may impact real-time communication or network performance. For example, in the above use case, the condition identification engine 602 identifies that Node ABC is scheduled to host the conference with 1000 attendees, but is only capable of handling 100 attendees. The condition identification engine 602 may identify the conditions by verifying statuses of machines on the network and accessing scheduled uses of the machines (e.g., via conference scheduling software). In some cases, the condition identification engine 602 may leverage artificial intelligence or machine learning technology to predict future conditions. The artificial intelligence or machine learning technology may be trained using conditions that were identified in the past and status data (e.g., load, processor usage data, or network interface card usage data) of nodes on the network. The artificial intelligence or machine learning technology may be based on supervised learning.

In some implementations, the condition identification engine 602 may predict future conditions that impact network communications based on past conditions that occurred and events/sensor data immediately preceding the conditions. For example, if a node fails when the temperature or humidity in a room reaches a predefined level, the condition identification engine 602 may identify the condition when the temperature or the humidity in the room get close to that level. In one example use case, a contact center may have higher call volumes on certain days of the week or times of the year. Artificial intelligence techniques (e.g., supervised learning or online learning) may be used to predict those days of the week or times of the year, and IT administrators of the contact center may ensure that additional nodes are available to handle the higher call volumes during those days of the week or times of the year.

The action suggestion engine 604 of the cloud data center component 600A identifies suggested actions for addressing a condition identified by the condition identification engine 602. For example, in response to determining, by the condition identification engine 602, that a node assigned to host a conference is incapable of serving the number of participants that are expected in the conference, the action suggestion engine 604 may propose adding additional hosting nodes, changing the hosting node, or hosting the conference on an external network. The proposed actions may be identified by accessing a data structure (e.g., a table) stored at the server 404 or in an external data repository (e.g., a database) that maps conditions to actions for addressing the conditions. Alternatively, the proposed actions may be determined using computerized statistical analysis or artificial intelligence techniques, for example, at least one of Bayesian analysis, supervised learning, unsupervised learning, reinforcement learning, and online learning.

In some examples, at the beginning of implementation of the disclosed technology, when there are few training examples, Bayesian analysis or the stored data structure may be used to suggest actions by the action suggestion engine 604. However, as the disclosed technology is implemented to resolve (or fail to resolve) more and more conditions and the number of training examples increases, a more complex machine learning technique (e.g., supervised learning, unsupervised learning, or reinforcement learning) may be used. As a result, the machine learning technique might not be used when there are relatively few training examples, to avoid overfitting of those training examples.

The administrator communication engine 606 of the customer premises component 600B handles communication with the administrator device 406. The administrator communication engine 606 generates and transmits the message indicating the condition and the actions for addressing the condition to the administrator device 406 and receives a selection of one of the actions from the administrator device 406. In some implementations, the message is transmitted via a messaging application that is associated with a software platform that provides real-time communication over the network.

The action performance engine 608 of the customer premises component 600B causes performance of the selected action, for example, by transmitting, over the network 402, instructions for performance of the selected action by impacted devices on the network 402. The impacted devices perform the action and transmit, to the server 404, a confirmation that the action was performed. In some cases, the action performance engine 608 tracks whether the action was successful in resolving the condition for training the action suggestion engine 604 to suggest future actions when conditions similar to the current condition for which the action was selected occur. The tracked information may be stored in a data structure that is used for training the statistical models and/or the artificial intelligence models.

In some implementations, the condition identification engine 602 and the action suggestion engine 604 reside at the cloud data center component 600A in order to identify customer trends (e.g., from multiple different customers) in aggregate and use artificial intelligence, machine learning, and/or statistical models to determine likely outcomes. The admin configuration engine 606 and the action performance engine 608 are specific to each customer and, thus, reside at the customer premises component 600B. In alternative implementations, the server 404 may be a single device (or set of devices) that includes each and every one of the engines 602, 604, 606, 608.

Figure 7:
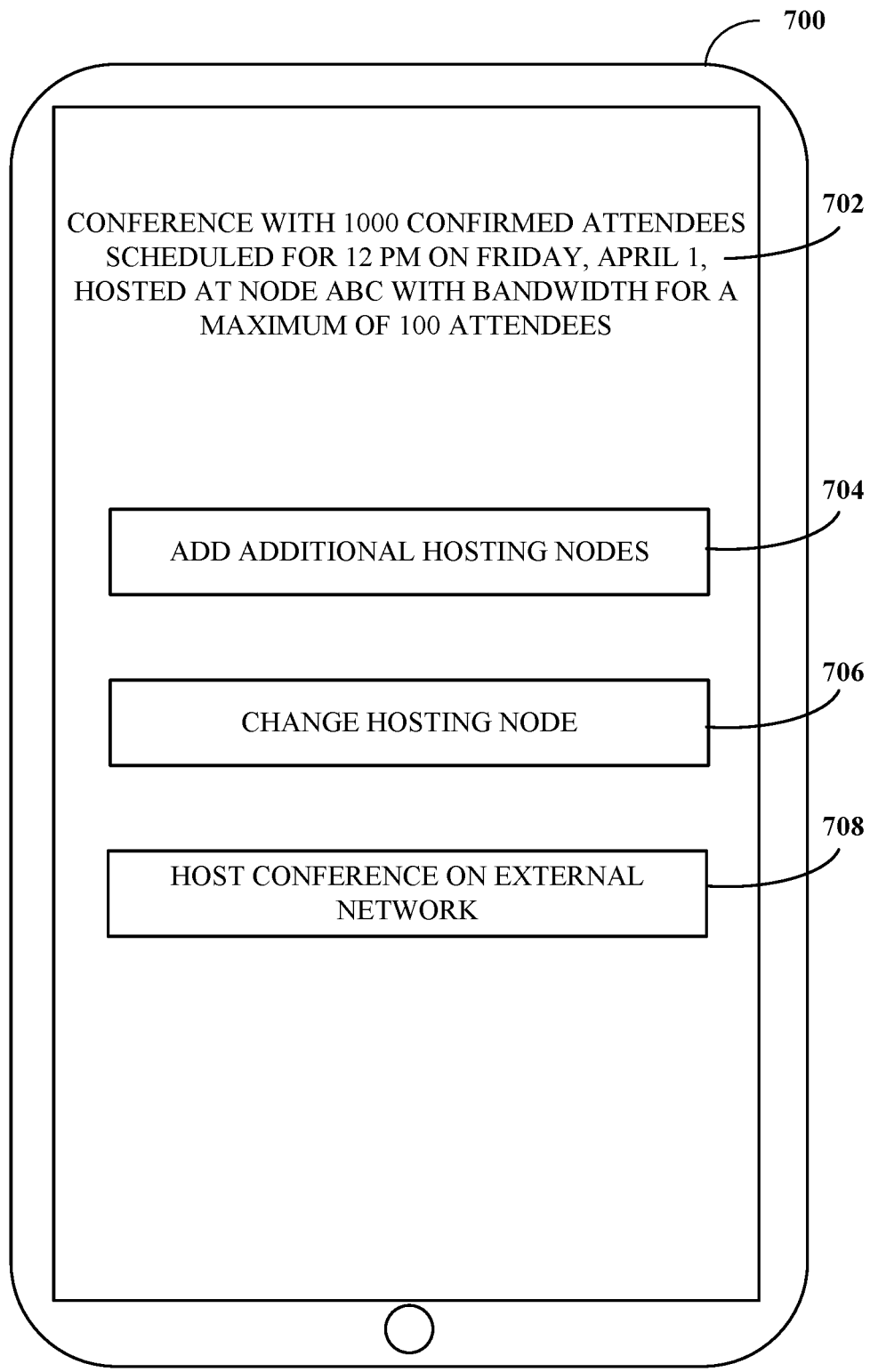
FIG. 7 illustrates an example graphical user interface which may be output for display at an administrator device for addressing conditions impacting communication services.

FIG. 7 illustrates an example graphical user interface (GUI) 700 which may be output for display at the administrator device 406 for addressing conditions impacting communication services. The GUI 700 may be presented at the administrator device 406. As shown, the GUI 700 is presented at a mobile phone or tablet computer. However, the GUI 700 may be presented at another human-operated device, for example, a laptop computer or a desktop computer. As shown, the GUI 700 includes a description of a condition 702 and proposed actions 704, 706, 708 for addressing the condition 702. The condition 702 may correspond to the condition 408, and the combination of the description of the condition 702 and the proposed actions 704, 706, 708 may correspond to the message 410. The proposed actions 704, 706, 708 may correspond to selectable elements that may be selected by a user of the GUI 700. The GUI 700 may be a chat card, and the proposed actions 704, 706, 708 may correspond to buttons within the chat card.

As illustrated in FIG. 7, the condition 702 is: "conference with 1000 confirmed attendees scheduled for 12 pm on Friday, April 1, hosted at Node ABC with bandwidth for a maximum of 100 attendees." The proposed actions 704, 706, 708 are: "add additional hosting nodes" 704, "change hosting node" 706, and "host conference on external network" 708. Each of the proposed actions 704, 706, 708 is associated with a button that includes a selectable element. A user of the GUI 700 may select one of the proposed actions 704, 706, 708, for example, by touching an associated position on a touchscreen.

In one example use case, the user selects the proposed action 704 ("add additional hosting nodes") by touching (e.g., with a finger or a stylus) a region of the GUI 700 associated with the proposed action 704. In response, the administrator device 406 associated with the GUI 700 accesses a URL address that causes transmission, to the server 404, of a message indicating that the proposed action 704 was selected. The server 404 identifies additional hosting nodes to add. Alternatively, the server 404 transmits, to the administrator device 406, a message requesting that the user of the administrator device select the additional hosting nodes from a set of available nodes. The administrator device 406 provides, to the server 404, a response to the message based on an input from the user. After the additional nodes are identified or selected, the server 404 transmits, over the network 402, instructions to add the additional hosting nodes. The instructions are received and processed at the additional hosting nodes and at the Node ABC.

In one example use case, the user selects the proposed action 706 ("change hosting node") by touching a region of the GUI associated with the proposed action 706. In response, the administrator device 406 associated with the GUI 700 accesses a URL address that causes transmission, to the server 404, of a message indicating that the proposed action 706 was selected. The server 404 selects a new hosting node for the conference with the 1000 confirmed attendees. Alternatively, the server 404 may transmit, to the administrator device 406, a message requesting that the user of the administrator device 406 select a new node for hosting the conference and providing options of nodes for selection by the user. The user selects (e.g., using a touchscreen) one of the nodes, and the administrator device 406 transmits, to the server 404, a message indicating the selected node. After identifying the new hosting node, the server 404 transmits, over the network 402, instructions indicating that the conference is to be hosted at the new hosting node and not at the Node ABC. The instructions are received and processed at the new hosting node and at the Node ABC.

In one example use case, the user selects the proposed action 708 ("host conference on external network") by touching a region of the GUI associated with the proposed action 708. In response, the administrator device 406 associated with the GUI 700 accesses a URL that causes transmission, to the server 404, of a message indicating that the proposed action 706 was selected. The server 404 transmits, to the external network and to the Node ABC (via the network 402) instructions for the conference to be hosted on the external network, and the instructions are processed by devices on the external network and by the Node ABC. The external network may be an off-premises network, for example, the Internet.

Figure 8:
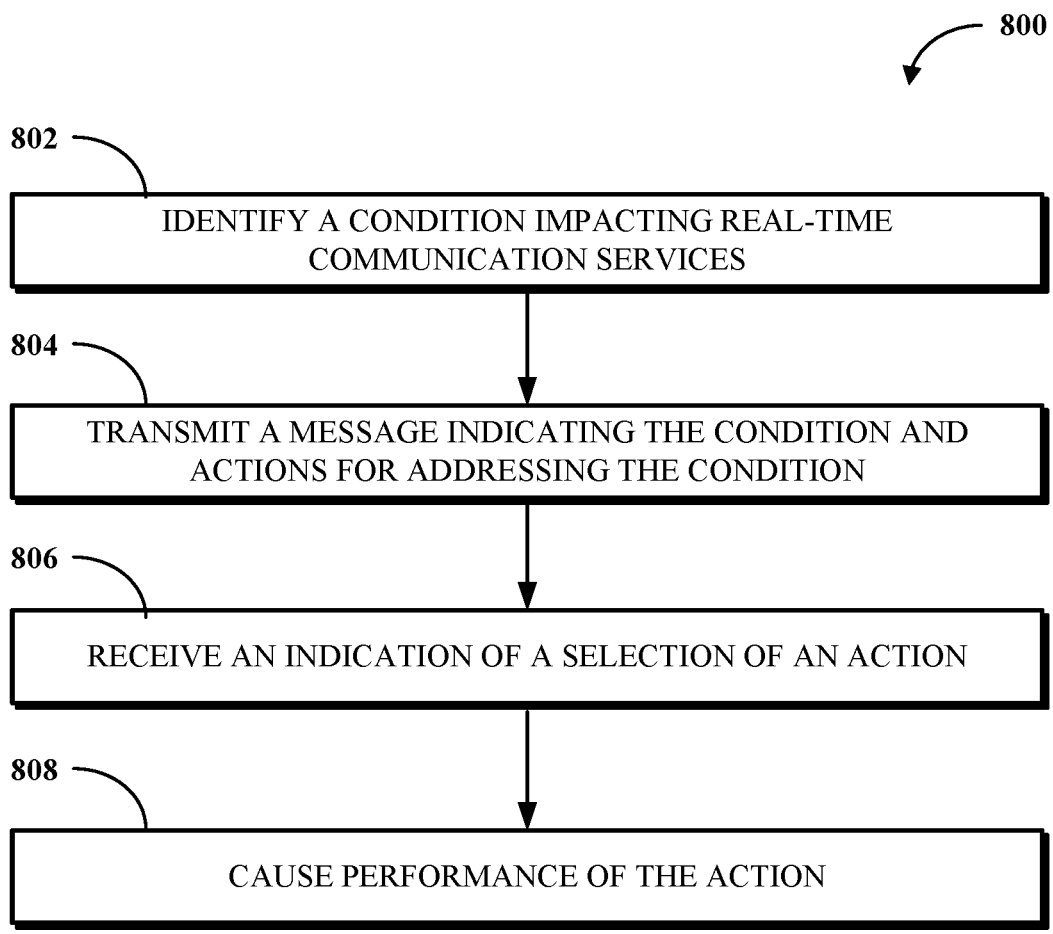
FIG. 8 is a flowchart of an example of a technique for addressing conditions impacting communication services.

To further describe some implementations in greater detail, reference is next made to examples of techniques which may be performed by or using a server (e.g., the server 404). FIG. 8 is a flowchart of an example of a technique 800 for addressing conditions impacting communication services. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a server (e.g., the server 404) of an on-premises data center used for a software platform identifies a condition impacting real-time communication services (e.g., conferencing services, voice or video calling services, telephony services, or instant messaging services) at a premises housing devices accessing the software platform. The premises may be, for example, an office, a business headquarters, or a university campus. The software platform may be a platform for providing the real-time communication services. The server may identify the condition by invoking a webhook. In some implementations, a webhook (e.g., to notify the server or to trigger the server to transmit a message) may be triggered based on a comparison of a current status of an on-premises network device to a key performance indicator. For example, a webhook may be triggered when a load of a network node exceeds 90% of the maximum load of the network node or when a processing speed of the network node falls below a threshold processing speed.

At 804, the server transmits, to a device of an administrator (e.g., the administrator device 406) associated with the premises via a messaging application for real-time communication between two or more human-operated devices (e.g., an instant messaging application), a message indicating the condition and including one or more actions for addressing the condition. For example, the message may include one or more selectable elements each associated with a different action for addressing the condition. The message may be a JavaScript Object Notation (JSON) formatted message or may use another messaging format. In some implementations, the message is transmitted to multiple devices of multiple administrators associated with the premises, including the device of the administrator. The server may create a chat room for addressing the condition, and may add accounts associated with the multiple devices of the multiple administrators to the chat room.

At 806, the server receives an indication of a selection of an action. For example, the server receives an indication of a selectable element selected from amongst the one or more selectable elements at the device of the administrator. Depending on the condition, the action may be, for example, at least one of draining a node impacted by the condition, shutting down the node impacted by the condition, or triaging the node impacted by the condition.

At 808, the server causes performance of the selected action (e.g., the action associated with the selectable element that was selected). For example, the server transmits, over a network (e.g., the network 402) instructions for one or more devices on the network to perform the selected action. The one or more devices receive the instructions and perform the instructions. In some cases, the one or more devices transmit, to the server, a confirmation that the instructions were performed. The server may determine whether, after the instructions were performed, the condition still exists. In some cases, the determination may be used to train a statistical engine or an artificial intelligence engine that generates the proposed actions for addressing conditions.

Some implementations are described below as numbered examples (Example 1, 2, 3, etc.). These examples are provided as examples only and do not limit the other implementations disclosed herein.

Example 1 is a method, comprising: identifying, at a server of an on-premises data center used for a software platform, a condition impacting real-time communication services at a premises housing devices accessing the software platform; transmitting, to a device of an administrator associated with the premises via a messaging application for real-time communication between two or more human-operated devices, a message indicating the condition and including one or more selectable elements each associated with a different action for addressing the condition; receiving an indication of a selectable element selected from amongst the one or more selectable elements at the device of the administrator; and causing, using the server, performance of the action associated with the selected selectable element.

In Example 2, the subject matter of Example 1 includes, wherein identifying the condition impacting the real-time communication services comprises invoking a webhook.

In Example 3, the subject matter of Examples 1-2 includes, wherein identifying the condition impacting the real-time communication services comprises comparing a current status of an on-premises network device to a key performance indicator.

In Example 4, the subject matter of Examples 1-3 includes, wherein the message indicating the condition comprises a JavaScript Object Notation (JSON) formatted message.

In Example 5, the subject matter of Examples 1-4 includes, wherein the message is transmitted to multiple devices of multiple administrators associated with the premises, including the device of the administrator, the method further comprising: creating a chat room for addressing the condition; and adding accounts associated with the multiple devices of the multiple administrators to the chat room.

In Example 6, the subject matter of Examples 1-5 includes, wherein the action associated with the selected selectable element comprises at least one of draining a node impacted by the condition, shutting down the node impacted by the condition, or triaging the node impacted by the condition.

In Example 7, the subject matter of Examples 1-6 includes, wherein the messaging application is associated with the software platform.

In Example 8, the subject matter of Examples 1-7 includes, storing, at the server, a data structure storing conditions and actions for addressing the conditions, wherein the message is generated using the stored data structure.

Example 9 is a non-transitory computer readable medium storing instructions operable to cause one or more processors to perform operations comprising: identifying, at a server of an on-premises data center used for a software platform, a condition impacting real-time communication services at a premises housing devices accessing the software platform; transmitting, to a device of an administrator associated with the premises via a messaging application for real-time communication between two or more human-operated devices, a message indicating the condition and including one or more selectable elements each associated with a different action for addressing the condition; receiving an indication of a selectable element selected from amongst the one or more selectable elements at the device of the administrator; and causing, using the server, performance of the action associated with the selected selectable element.

In Example 10, the subject matter of Example 9 includes, storing instructions operable to cause the one or more processors to perform operations comprising: storing, at the server, a data structure storing conditions and actions for addressing the conditions, wherein the message is generated using the stored data structure; and generating the stored data structure using online semi-supervised machine learning.

In Example 11, the subject matter of Examples 9-10 includes, storing instructions operable to cause the one or more processors to perform operations comprising: storing, at the server, a data structure storing conditions and actions for addressing the conditions, wherein the message is generated using the stored data structure; and generating the stored data structure using online reinforcement learning.

In Example 12, the subject matter of Examples 9-11 includes, storing instructions operable to cause the one or more processors to perform operations comprising: generating, using an artificial intelligence engine, the one or more selectable elements each associated with the different action for addressing the condition.

In Example 13, the subject matter of Examples 9-12 includes, wherein causing performance of the action associated with the selected selectable element comprises: transmitting, from the server to one or more network devices, a signal for performance of the action by the one or more network devices.

In Example 14, the subject matter of Examples 9-13 includes, wherein identifying the condition impacting the real-time communication services comprises comparing a current status of an on-premises network device to a key performance indicator.

In Example 15, the subject matter of Examples 9-14 includes, wherein the message is transmitted to multiple devices of multiple administrators associated with the premises, including the device of the administrator, the method further comprising: creating a chat room for addressing the condition; and adding accounts associated with the multiple devices of the multiple administrators to the chat room.

In Example 16, the subject matter of Examples 9-15 includes, wherein the action associated with the selected selectable element comprises at least one of draining a node impacted by the condition, shutting down the node impacted by the condition, or triaging the node impacted by the condition.

Example 17 is an apparatus, comprising: a memory; and a processor configured to execute instructions stored in the memory to: identify, at a server of an on-premises data center used for a software platform, a condition impacting real-time communication services at a premises housing devices accessing the software platform; transmit, to a device of an administrator associated with the premises via a messaging application for real-time communication between two or more human-operated devices, a message indicating the condition and including one or more selectable elements each associated with a different action for addressing the condition; receive an indication of a selectable element selected from amongst the one or more selectable elements at the device of the administrator; and cause, using the server, performance of the action associated with the selected selectable element.

In Example 18, the subject matter of Example 17 includes, wherein causing performance of the action associated with the selected selectable element comprises: transmitting, from the server to one or more network devices, a signal for performance of the action by the one or more network devices; and receiving, at the server, a confirmation that the one or more network devices performed the action.

In Example 19, the subject matter of Examples 17-18 includes, the processor configured to execute instructions stored in the memory to: generate, using an artificial intelligence engine, the one or more selectable elements each associated with the different action for addressing the condition.

In Example 20, the subject matter of Examples 17-19 includes, wherein causing performance of the action associated with the selected selectable element comprises: transmitting, from the server to one or more network devices, a signal for performance of the action by the one or more network devices.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    identifying, at a server of an on-premises data center used for a software platform, a condition impacting real-time communication services at a premises housing devices accessing the software platform;
    transmitting, to a device of an administrator associated with the premises via a messaging application for real-time communication between two or more human-operated devices, a message indicating the condition and including one or more selectable elements each associated with a different action for addressing the condition, wherein the message is transmitted to multiple devices of multiple administrators associated with the premises, including the device of the administrator;
    receiving an indication of a selectable element selected from amongst the one or more selectable elements at the device of the administrator;
    causing, using the server, performance of an action associated with the indicated selectable element;
    creating a chat room for addressing the condition; and
    adding accounts associated with the multiple devices of the multiple administrators to the chat room.

2. The method of claim 1, wherein identifying the condition impacting the real-time communication services comprises invoking a webhook.

3. The method of claim 1, wherein identifying the condition impacting the real-time communication services comprises comparing a current status of an on-premises network device to a key performance indicator.

4. The method of claim 1, wherein the message indicating the condition comprises a JavaScript Object Notation (JSON) formatted message.

5. The method of claim 1, wherein the action associated with the indicated selectable element comprises at least one of draining a node impacted by the condition, shutting down the node impacted by the condition, or triaging the node impacted by the condition.

6. The method of claim 1, wherein the messaging application is associated with the software platform.

7. The method of claim 1, comprising:
    storing, at the server, a data structure storing conditions and actions for addressing the conditions, wherein the message is generated using the stored data structure.

8. A non-transitory computer readable medium storing instructions operable to cause one or more processors to perform operations comprising:
    identifying, at a server of an on-premises data center used for a software platform, a condition impacting real-time communication services at a premises housing devices accessing the software platform;
    transmitting, to a device of an administrator associated with the premises via a messaging application for real-time communication between two or more human-operated devices, a message indicating the condition and including one or more selectable elements each associated with a different action for addressing the condition, wherein the message is transmitted to multiple devices of multiple administrators associated with the premises, including the device of the administrator;
    receiving an indication of a selectable element selected from amongst the one or more selectable elements at the device of the administrator;
    causing, using the server, performance of an action associated with the indicated selectable element;
    creating a chat room for addressing the condition; and
    adding accounts associated with the multiple devices of the multiple administrators to the chat room.

9. The non-transitory computer-readable medium of claim 8, storing instructions operable to cause the one or more processors to perform operations comprising:
    storing, at the server, a data structure storing conditions and actions for addressing the conditions, wherein the message is generated using the stored data structure; and
    generating the stored data structure using online semi-supervised machine learning.

10. The non-transitory computer-readable medium of claim 8, storing instructions operable to cause the one or more processors to perform operations comprising:
    storing, at the server, a data structure storing conditions and actions for addressing the conditions, wherein the message is generated using the stored data structure; and
    generating the stored data structure using online reinforcement learning.

11. The non-transitory computer-readable medium of claim 8, storing instructions operable to cause the one or more processors to perform operations comprising:

generating, using an artificial intelligence engine, the one or more selectable elements each associated with the different action for addressing the condition.

12. The non-transitory computer-readable medium of claim 8, wherein causing performance of the action associated with the indicated selectable element comprises:

transmitting, from the server to one or more network devices, a signal for performance of the action by the one or more network devices.

13. The non-transitory computer-readable medium of claim 8, wherein identifying the condition impacting the real-time communication services comprises comparing a current status of an on-premises network device to a key performance indicator.

14. The non-transitory computer-readable medium of claim 8, wherein the action associated with the indicated selectable element comprises at least one of draining a node impacted by the condition, shutting down the node impacted by the condition, or triaging the node impacted by the condition.

15. An apparatus, comprising:

a memory; and a processor configured to execute instructions stored in the memory to:

identify, at a server of an on-premises data center used for a software platform, a condition impacting real-time communication services at a premises housing devices accessing the software platform;

transmit, to a device of an administrator associated with the premises via a messaging application for real-time communication between two or more human-operated devices, a message indicating the condition and including one or more selectable elements each associated with a different action for addressing the condition, wherein the message is transmitted to multiple devices of multiple administrators associated with the premises, including the device of the administrator;

receive an indication of a selectable element selected from amongst the one or more selectable elements at the device of the administrator;

cause, using the server, performance of an action associated with the indicated selectable element;

create a chat room for addressing the condition; and add accounts associated with the multiple devices of the multiple administrators to the chat room.

16. The apparatus of claim 15, wherein causing performance of the action associated with the selected selectable element comprises:

transmitting, from the server to one or more network devices, a signal for performance of the action by the one or more network devices; and receiving, at the server, a confirmation that the one or more network devices performed the action.

17. The apparatus of claim 15, the processor configured to execute instructions stored in the memory to:

generate, using an artificial intelligence engine, the one or more selectable elements each associated with the different action for addressing the condition.

18. The apparatus of claim 15, wherein causing performance of the action associated with the selected selectable element comprises:

transmitting, from the server to one or more network devices, a signal for performance of the action by the one or more network devices.

\* \* \* \* \*